US008842124B2

(12) United States Patent
Williams

(10) Patent No.: US 8,842,124 B2
(45) Date of Patent: Sep. 23, 2014

(54) DECLARATIVE INTERFACE FOR DEVELOPING TEST CASES FOR GRAPHICS PROGRAMS

(71) Applicant: Roy E. Williams, Seattle, WA (US)

(72) Inventor: Roy E. Williams, Seattle, WA (US)

(73) Assignee: Google Inc., Mountain View, CA (US)

( * ) Notice: Subject to any disclaimer, the term of this patent is extended or adjusted under 35 U.S.C. 154(b) by 50 days.

(21) Appl. No.: 13/654,798

(22) Filed: Oct. 18, 2012

(65) Prior Publication Data
US 2013/0106878 A1 May 2, 2013

Related U.S. Application Data

(60) Provisional application No. 61/628,215, filed on Oct. 26, 2011.

(51) Int. Cl.
*G06T 1/00* (2006.01)
*G06T 15/00* (2011.01)
*G06F 15/00* (2006.01)
*G06F 11/07* (2006.01)
*G06T 1/20* (2006.01)
*G06F 11/36* (2006.01)

(52) U.S. Cl.
CPC .............. *G06T 1/00* (2013.01); *G06F 11/0724* (2013.01); *G06T 1/20* (2013.01); *G06F 11/0751* (2013.01); *G06F 11/3672* (2013.01)
USPC .......................................... 345/522; 345/501

(58) Field of Classification Search
CPC ....... G06T 1/00–1/0092; G06T 15/00–15/005; G06T 15/50–15/506; G06T 15/15–15/60; G06F 15/00
USPC .......................................... 345/426, 501, 522
See application file for complete search history.

(56) References Cited

U.S. PATENT DOCUMENTS 6,314,470 B1 11/2001 Ward et al.
7,417,632 B2 * 8/2008 Muller .......................... 345/418
(Continued)

FOREIGN PATENT DOCUMENTS

KR 10-0915329 B1 9/2009

OTHER PUBLICATIONS

"Learning WebGL: Lessons 'n' Links," (2009-2013) Retrieved from the Internet on Mar. 27, 2013: URL:http://learningwebgl.com/blog/.
(Continued)

*Primary Examiner* — Jacinta M Crawford
(74) *Attorney, Agent, or Firm* — Marshall, Gerstein & Borun LLP

(57) ABSTRACT

A declarative user interface for testing graphics programs is associated with an API that, when used in a program executable on a general-purpose processor, specifies (i) a graphics program to be tested, where the graphics program is stored on a computer-readable medium and includes instructions executable on a graphics card, (ii) a test input to be applied to the graphics program, and (iii) an expected result of executing the graphics program on the graphics card when the test input is applied to the graphics program. A test code generator, when executed on the general-purpose processor, is configured to (i) process a test specification program that invokes the API to specify the graphics program, the test input, and the expected result, and (ii) automatically generate a test graphics program based on the specified graphics program to be executed on the graphics card to test the graphics program.

20 Claims, 11 Drawing Sheets

(56) References Cited

U.S. PATENT DOCUMENTS

| | | | |
|---|---|---|---|
| 2004/0012632 A1 | 1/2004 | King et al. |
| 2006/0132480 A1 | 6/2006 | Muller |
| 2008/0307202 A1 | 12/2008 | Wong et al. |
| 2009/0049214 A1 | 2/2009 | Chen et al. |
| 2010/0149185 A1 | 6/2010 | Capewell et al. |
| 2010/0201695 A1 | 8/2010 | Hill et al. |
| 2011/0099425 A1 | 4/2011 | Liu |

OTHER PUBLICATIONS

"There are two ways of constructing a software design: One way is to make it so simple that there are obviously no deficiencies, and the other way is to make it so complicated that there are no obvious deficiencies. The first method is far more difficult," Jim Tilander (2006-2010). Retrieved from the Internet on Mar. 27, 2013: URL:http://www.tilander.org/aurora2/UnitTestCg/index.html.

International Search Report and Written Opinion for Application No. PCT/US2012/061462, dated Feb. 25, 2013.

Mozilla Developer Network, "WebGL," (2005-2013) Retrieved from the Internet on Mar. 27, 2013: URL:https://developer.mozilla.org/en-US/docs/WebGL.

NVIDIA Shader Debugger User's Guide (2008).

Rastergrid Blogosphere, "Unit Testing Open GL Applications," 2010. Retrieved from the Internet on Mar. 27, 2013: URL:http://rastergrid.com/blog/2010/02/unit-testing-opengl-applications/.

Visual Studio, "Debugging DirectX Graphics," Microsoft © 2013. Retrieved from the Internet on Mar. 27, 2013: URL:http://msdn.microsoft.com/en-us/library/vstudio/hh315751.aspx.

International Preliminary Report on Patentability for Application No. PCT/US2012/061462, dated Apr. 29, 2014.

\* cited by examiner

DECLARATIVE INTERFACE FOR DEVELOPING TEST CASES FOR GRAPHICS PROGRAMS

CROSS REFERENCE TO RELATED APPLICATIONS

This application claims the benefit of U.S. Provisional Patent Application No. 61/628,215, filed on Oct. 26, 2011, entitled "Testing Graphics Card Programs," the disclosure of which is hereby expressly incorporated herein by reference.

This application is related to the following commonly owned, co-pending applications: U.S. patent application Ser. No. 13/654,768, entitled "Automatically Testing a Program Executable on a Graphics Card," U.S. patent application Ser. No. 13/654,810, entitled "Event Logging Mechanism for a Program Executing on a Graphics Card," and U.S. patent application Ser. No. 13/654,821, entitled "Automatically Testing Compatibility between a Graphics Card and a Graphics Program," all filed on the same day as the present application, and all hereby expressly incorporated by reference herein.

FIELD OF THE DISCLOSURE

The present disclosure relates to developing programs for graphics card and, more particularly, to automatically testing programs executable on graphics cards.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Today, many software applications that utilize graphics cards (i.e., hardware dedicated to efficiently rendering images) include graphics programs called "shaders." Generally speaking, shaders allow developers to directly access a graphics card and utilize its large computational power to achieve visually rich rendering with interactive performance. A typical graphics card includes a graphics processing unit (GPU) designed to efficiently execute parallel processing functions and, more particularly, to efficiently process multiple transformations of geometric shapes and colors. A graphics card also includes a memory that stores data buffers on which the GPU operates.

Many applications that include graphics functionality rely on Open Graphics Library (OpenGL) standard specification, which provides a cross-platform and cross-language development environment, and many shaders are described in a specialized language called OpenGL Shading Language (GLSL). A software library called Web-based Graphics Library (WebGL) allows developers of web pages to write scripts (for example, using JavaScript™) that include GLSL code. More particularly, developers can use GLSL to write code for vertex shaders, fragment shaders, and define variables of various scope (e.g., global variables, variables that define an interface between shaders, etc.). Vertex shaders generally operate on vertices in two- or three-dimensional space, while fragment shaders operate on individual pixels. For example, a vertex shader can specify how vertices of a triangle stored in a buffer should be transformed to render the triangle in a particular way depending on the perspective, rotation, etc. A fragment shader can then generate pixels of appropriate color inside the triangle.

A GLSL shader in general executes much faster than JavaScript, and developers accordingly include a significant amount of program logic in GLSL programs. For example, the direction of the shadow a building casts or the location of an orbiting object can be computed directly in a shader instead of JavaScript code. However, once compiled, a GLSL shader executes directly on a graphics card, and thus the shader is difficult to test. Because the final output of the GLSL shader is color, developers cannot simply add debugging or logging information to a GLSL program via GLSL instructions. Instead, developers often need to render an entire scene and analyze the entire rendered image.

SUMMARY

In one implementation, a computer-readable medium stores thereon instructions for providing a declarative user interface for testing graphics programs. The instructions include first instructions that implement an application programming interface (API) that, when used in a program executable on a general-purpose processor, specifies (i) a graphics program to be tested, where the graphics program is stored on a computer-readable medium and includes instructions executable on a graphics card, (ii) a test input to be applied to the graphics program, and (iii) an expected result of executing the graphics program on the graphics card when the test input is applied to the graphics program. The instructions also include second instructions that implement a test code generator that, when executed on the general-purpose processor, is configured to (i) process a test specification program that invokes the API to specify the graphics program, the test input, and the expected result, and (ii) automatically generate a test graphics program based on the specified graphics program, where the test graphics program is configured to execute on the graphics card to test the graphics program using the specified test input and the specified expected result.

In another implementation, a method for automatically testing a graphics program executable on a graphics card is implemented in a computing device having a processor, where the graphics card is communicatively coupled to the processor. The method includes receiving the graphics program at the computing device, where the graphics program includes a set of one or more instructions in a shading language supported by the graphics card. The method also includes receiving, at the computing device, a test specification in a programming language different from the shading language, where the programming language is supported by the device but not by the graphics card, and wherein the test specification identifies the graphics program and specifies (i) a test input to be provided to the graphics program and (ii) an expected result which the graphics program is expected to generate based on the test input. The method further includes automatically causing a test of the graphics program to be executed on the graphics card, including applying the test input to the graphics program and comparing a result of executing the graphics program to the expected result, and generating, at the computing device, an indication of whether the test of the graphics program executed according to the test specification.

In still another implementation, a computing device includes a display device, a graphics card including a graphics processing unit (GPU) communicatively coupled to the display device, a processor communicatively coupled to the graphics card, and a memory communicatively coupled to the processor. The memory stores (i) a graphics program including a plurality of instructions executable on the graphics card to render images for display on the display device, (ii) a declarative user interface including a plurality of instructions executable on the processor but not on the graphics card, where the declarative interface implements an API for specifying a test case for the graphics program, and where the API is invokable via a function having a syntax of a programming language executable on the processor, and (iii) a test code generator including a plurality of instructions that, when executed on the processor, receives a test specification program that identifies the graphics program and invokes the API to specify the test case, and automatically generates a test graphics program based on the graphics program and the test case, wherein the test graphics program is configured to execute on the graphics card and output an indication of whether the graphics program satisfies the test case.

DETAILED DESCRIPTION

Overview

Figure 1:
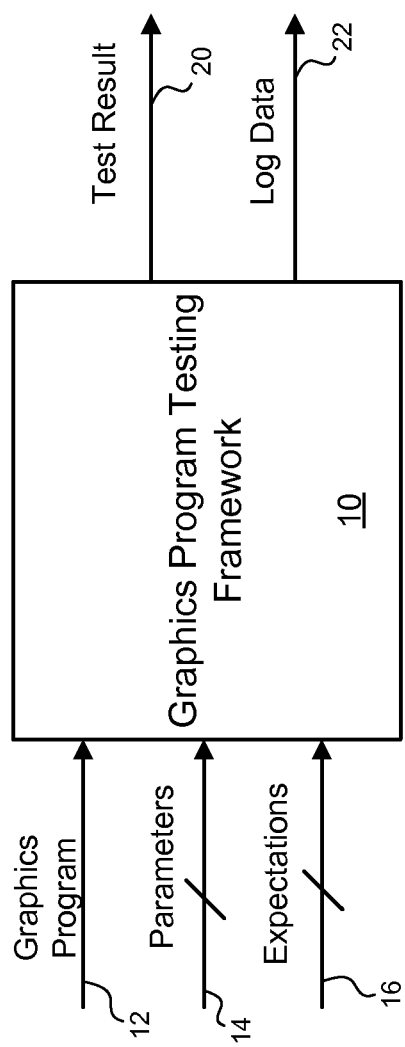
FIG. 1 is a high-level block diagram of a test framework for testing graphics programs (such as shaders) that may be implemented using the techniques of the present disclosure.

A graphics program test framework ("the test framework") allows a user to specify a graphics program that executes on a graphics card, such as a vertex shader or a fragment shader, to automatically generate a test graphics program that executes on the graphics card and outputs an indication of whether the specified graphics program operates correctly. The graphics program can include instructions in a programming language capable of directly controlling a graphics pipeline, such as GLSL. However, the user can create, edit, and view the graphics program using a typical user interface of a computing device. The test framework in some implementations automatically executes the test graphics program and processes the generated indication of whether the original graphics program operates correctly. In general, the test framework can operate on a computing device equipped with a general-purpose processor (e.g., a CPU), a display device, and a graphics card, or on a server equipped with a general-purpose processor and coupled to such a computing device via a communication network. The user can utilize the test framework to develop a large suite of unit test cases for one or several graphics programs, if desired, and direct the test framework to execute the entire suite in a single session.

In an example scenario, the user provides a test specification that includes an expected result, e.g., a value the graphics program is expected to output for a certain test case. The test framework compares this expected result to the value the graphics program actually outputs ("the execution result"). Depending on whether the execution result matches the expected result, the test graphics program outputs a pass indication or a fail indication in the form of a color applied to one or several pixels. The output color can communicate the result of testing the graphics program directly to the user (e.g., a green triangle rendered on a display device can indicate success and a red triangle can indicate failure), or the output color be converted to an alphanumerical value.

More generally, the expected result can correspond to an expected value of any specified program variable. In some implementations, the test specification also indicates the amount of error to be tolerated when comparing the execution result to the expected result. Further, the test specification may include a test input such as a selection of a graphics program variable along with a value to be assigned to the selected variable.

In the server implementation, a client device provides a graphics program along with the corresponding test specification to the server. The test framework operating on the server generates test graphics program based on the original graphics program in accordance with the test specification and provides the test graphics program to the client device. The client device then executes the test graphics program on the graphics card.

To generate the graphics program, the test framework may analyze the source code of the graphics program and automatically generate a modified version of the source as the test graphics program. In particular, the test framework may generate new instructions (e.g., to compare the execution result to the expected result, encode the comparison result as color), modify some of the original instructions to "mock out" variables and functions (e.g., to replace references to global variables with references to temporary variables so as to assign other values to the global variables), and retain some of the original instructions without modification.

The test framework in some implementations also provides logging capability to instructions in a programming language that does not include functions for recording intermediate values, events, etc. in a memory accessible to a general-purpose processor. For example, the test framework provides a function whose syntax conforms to a high-level scripting language (such as Javascript) for specifying a variable in a GLSL shader program, and the test framework automatically generates a logging instruction that causes the value of the selected variable to be output as color. The function in some implementations may define an assert for logging the actual value of a certain variable if this value is different from the specified (expected) value of the variable. In either case, the test framework can automatically include the logging instruction in the test graphics program.

To log the selected variable, the logging instruction may encode the value, which may be a floating-point value, as a four-channel pixel color. The test framework may also generate instructions fully or partially executable on a general-purpose processor for retrieving the pixel color corresponding to the encoded value from the graphics card and decoding the pixel color to retrieve the value of the selected variable. The decoded value then can be output via a display device, stored in the memory of a computing device that is accessible to the computing device (rather than in the memory of the graphics card), or otherwise provided to the user.

To simplify the process of defining test cases, organizing the test cases into test suites, selecting variables for logging, etc., the test framework in some cases provides a declarative user interface. In particular, the test framework may implement a set of one or several application programming interface (API) functions having syntax consistent with Javascript or another suitable programming language interpretable and/or directly executable on a general-purpose processor. Thus, rather than modifying the source code of a shader program, the user simply describes the test in a test specification program in a scripting language. The user may invoke the API to specify the graphics program to be tested, select one or more variables on which the graphics program operates, specify respective expected values for these variables, specify respective margins of error to be tolerated, etc. The term "API" in this application may refer to a single function or a set of functions. Thus, the user may invoke one or multiple functions, each receiving one or several parameters. Further, in some implementations, the test framework exposes a template for specifying the graphics programs, the test cases, etc.

Some of the techniques which the test framework implements also can be used to automatically test compatibility between a graphics card and a graphics program to be executed on the graphics card. Today, many manufacturers of graphics cards provide different support for WebGL and other graphics content. Two client devices thus can render the same WebGL content differently. Moreover, a client device equipped with a graphics card does not report the parameters of the graphics card (e.g., manufacturer, software version) to a web server when requesting graphics content. As a result, the web server cannot determine whether the graphics content will be properly rendered client device based on the request from the client device.

To assess the ability of a client device to render graphics content, a web server of the present disclosure provides a compatibility test program to the client device, which executes a series of one or more tests on the graphics card. In particular, the compatibility test program may include test instructions that execute on the GPU of the graphics card as well as test processing instructions that execute on the general-purpose processor of the client device. The test instructions generate test output in the form of pixel color, for example, and the test processing instructions retrieve the pixel color from the graphics card and process the test output. The test processing instructions may generate a notification on the client device and/or the web server when one or more of the tests fail.

In one implementation, the web server provides the compatibility test program along with the requested graphics content. In another implementation, the web server provides the compatibility test program in response to the request for graphics content, and provides the requested graphics content only if the tests pass. To avoid redundant testing, the client device may provide to the web server an indication of whether the client device previously passed compatibility testing (e.g., in a cookie). The web server accordingly may provide the compatibility test program to the client device in response to only the first request for graphics content, or a certain type of graphics content, depending on implementation.

High-Level Test Framework Architecture

A test framework 10 illustrated in FIG. 1 can operate on shaders and, more generally, on graphics programs that execute on GPUs. The test framework 10 can execute on a single computing device or, if desired, on multiple devices in a distributed manner. In one implementation, the test framework 10 is implemented in a scripting language interpretable at runtime by a web browser or another implementation. In another implementation, the test framework 10 operates as a compiled component including instructions directly executable on a processor. The test framework 10 in general can be implemented in any suitable manner.

In operation, the test framework 10 receives a graphics program 12 along with a test specification that includes one or several input values or parameters 14 and one or several expected values 16. The graphics program 12 is executable on an actual or emulated graphics card, and generally is not executable directly on a general-purpose processor. However, a user typically can create and edit the graphics program 12 using the user interface of a computing device. The graphics program 12 may be compilable, so that the graphics program 12 is transformed into a set of low-level instructions specific to a GPU to be executed on a graphics card. The test framework 10 automatically generates test results 20 and, in some cases, log data 22.

Figure 2:
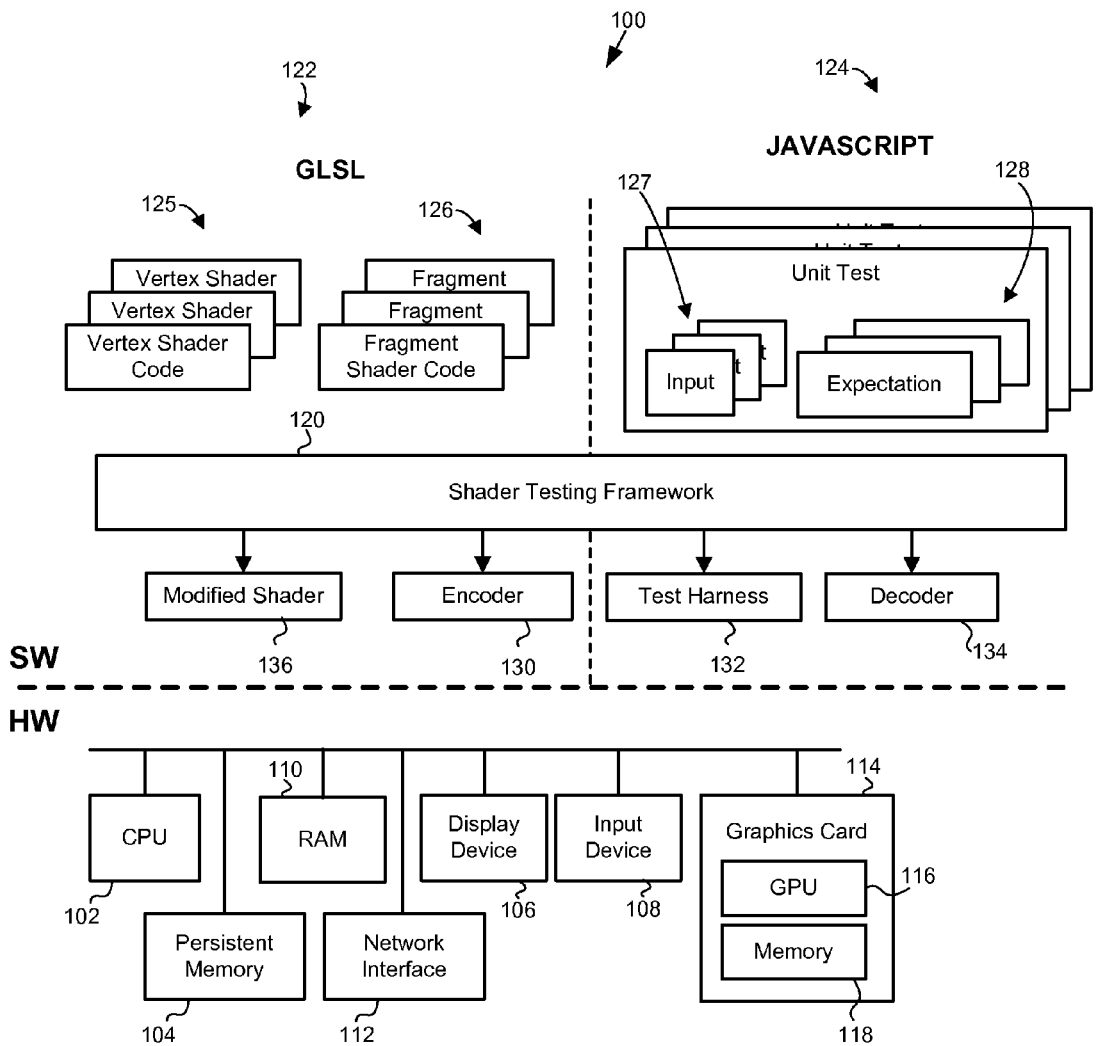
FIG. 2 is a block diagram that illustrates hardware and software components of an example computing device in which the test framework of FIG. 1 can operate.

Referring to FIG. 2, an example computing device 100 that implements a graphics program test framework may be a desktop computer, a laptop computer, a smartphone, or any other suitable computing device. The computing device 100 includes one or more processors, such as a central processing unit (CPU) 102, a persistent memory module 104 (e.g., a disk, a flash memory unit), a display device 106, an input device 108, a random access memory (RAM) 110, and a network interface module 112. The computing device 100 also includes a graphics card 114 having a GPU 116 and a memory 118, which can communicate with the CPU 102 via any suitable interface (e.g., Accelerated Graphics Port (AGP), Peripheral Component Interconnect (PCI), etc.). Depending on the implementation, the computing device 100 also may include other components such as additional processors, additional memory units, multiple input devices (e.g., a keyboard, a pointing device), various peripheral devices, etc.

The components of the computing device 100 generally may be provided in any suitable manner. For example, the display device 106 and the input device 108 can be provided as parts of a touchscreen. As another example, the RAM 112 may be provided on the same chip as the CPU 102 or on a separate chip. However, for clarity, the components 102-118 are illustrated separately.

A shader testing framework 120, which may be generally similar to the test framework 10 of FIG. 1, executes in the computing device 100 to automatically unit-test shader programs 122 specified in the GLSL language, for example, using unit test specifications 124. The shader programs 122 may include vertex shader programs 125 and fragment shader programs 126. The shader programs 122 may reside in a memory of the computing device 100 (e.g., in the persistent memory 104), on a separate computing device, in a cloud, etc. As is known, a shader program may include multiple functions and operate on various variables. In general, each unit test 124 tests the behavior of a particular shader program 125 or 126 for a certain vertex or fragment. Moreover, in some cases, developers can use the test network 120 to test individual functions within shaders.

If desired, the unit test specifications 124 can be text files that conform to a certain predefined format. Alternatively, a user can create the unit test specifications 124 using an API compatible with JavaScript or another suitable scripting language. Each unit test specification 124 may include inputs 127 and expectations 128, which may refer to uniforms, textures, attributes, varying, and global variables such as gl_FragCoord, gl_FrontFacing, gl_PointCoord, etc. Together, a set of several unit test specifications 124 can define a test suite. An example interface for defining the units tests 124 is discussed in more detail below with reference to FIG. 5.

The framework 120 may include or dynamically generate an encoder 130 to encode values such as those selected via asserts, intermediate results of executing a shader program, the final result of testing a shader program, cumulative results of testing, etc. as a pixel or a set of pixels of a certain color. A decoder 134 performs the reverse operation and converts pixel color to a numeric or alphanumeric value. The encoder 130 may be implemented in GLSL code executable on the graphics card 114. For example, the test framework 120 may insert instances of the source code of the encoder 130 (which may be further modified, when appropriate) into the shader programs 122 to generate modified shader programs 136, which then render a green triangle if the test passed or a red triangle if the test failed. Suitable techniques for modifying shader programs, as well as the components that may implement these techniques, are discussed in more detail with reference to FIGS. 5 and 6. Further, the encoder 130 may generate a triangle in which the color of the pixels encodes a value actually generated by the shader program being tested. In some implementations, the encoder 130 generates an indication of the actual value produced by the shader program only if the corresponding test fails.

The test network 120 may dynamically generate a test harness 132 in JavaScript, for example, to invoke the instructions of the shader program 122 being tested (as modified by the test network 120), test the asserts being specified via the expectation descriptions 128, cause the modified shader programs executing on the graphics card 114 to output test results and asserts as color-encoded values, etc. The decoder 134, which also may be implemented in JavaScript, may then retrieve the color-encoded values from the graphics card 114, decode the retrieved values, and generate a text-based (or otherwise user-friendly) representation of the color-encoded values. To this end, the decoder 134 may use the readPixels( ) WebGL function, for example. The test framework 120 may insert instances of the decoder 134 into dynamically generated code that processes the results of executing modified shader programs.

It is noted that in some implementations, a test framework similar to the test framework 120 operates on a server that receives a shader program and a test specification from a client device via a network, generates a modified shader program, and provides the modified shader program to the client device for execution.

Encoding Values as Pixel Color

Referring still to FIG. 2, in an example implementation, the encoder 130 encodes a binary test result or a non-binary value as an array of 24 bits according to RGBA color specification. More specifically, the encoder 130 uses the bits for encoding a channel in each of the four colors as a respective six-bit array, thus using 4*6=24 bits to encode information. This technique allow the encoder 130 to round errors when converting values between float and int data types. To retrieve float values form a shader, a format similar to IEEE 754 may be used, for example. In some cases, certain indications can be encoded as binary values. For example, an indication of whether a test result passed or failed can be encoded as a binary value. As another example, an indication of whether a certain block of code was hit also can be encoded as a binary value. Alternatively, for non-binary values, all 32 bits can be used.

The encoder 130 can cause the color encoding a test result to be applied to each pixel enclosed within a triangle. For example, the encoder 130 can execute a simple vertex shader to generate the vertices of a triangle, and a simple fragment shader to apply the color to all pixels inside the triangle. The decoder 134 then can read any pixel within the triangle (using the readPixels( ) functions defined by WebGL or GLSL, for example) and convert the pixel color back to the value encoded by the encoder 130.

In some cases, the modified shader code may produce multi-component values (e.g., if the amount of encoding available in a pixel is not sufficient). In these cases, the test framework 120 may make multiple "round trips" to the graphics card 114 to retrieve all components of the value. In other words, the test framework 120 may read pixels from the corresponding buffer on the graphics card multiple times. For example, to communicate the value of an entire variable of type mat4 to a developer, 16 values need to be encoded by the modified shader program (or the harness program), and accordingly 16 extraction operations need to be made. As another example, gl_FragColor in a certain harness program may encode a four-element expected value (such as a vector). In this case, the corresponding extraction code may be run four times to extract each element of gl_FragColor.

Figure 3A:
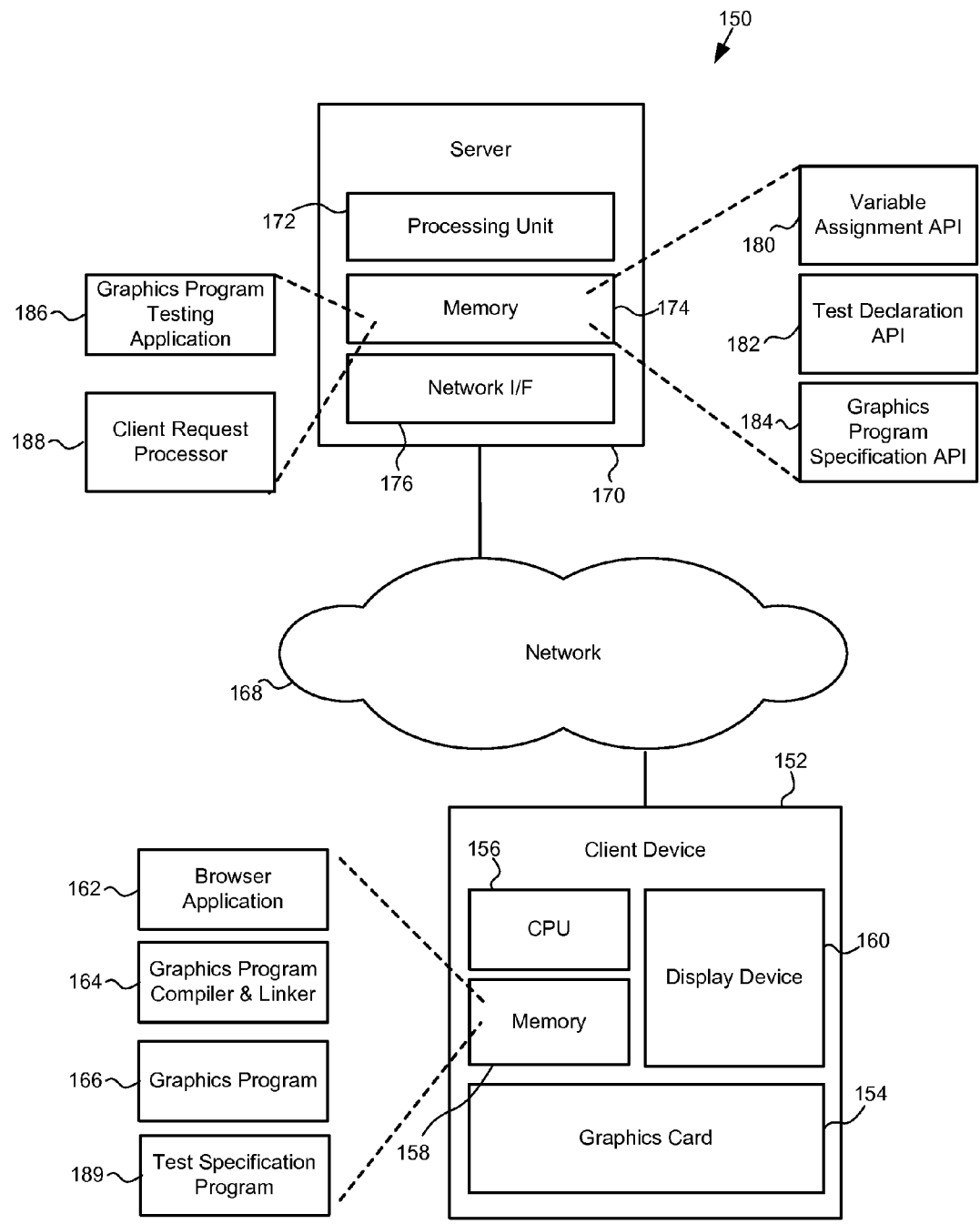
FIG. 3A is diagram of an example system in which a test framework similar to the test framework of FIG. 1 is implemented in a system including a client device and a server, communicatively coupled via a communication network.

Testing Graphics Programs and Verifying Compatibility in a Communication Network FIG. 3A illustrates a communication network 150 in which a client device 152 and a server 170 communicate via a wide area network 168 such as the Internet. The client device 152 includes a graphics card 154, a CPU 156, a memory 158, and a display device 160. Instructions for various software applications are stored in the memory 158 and execute on the CPU 156. More specifically, the memory 158 stores a web browser application 162, a graphics program compiler and linker 164, and a graphics program 166 (e.g., a vertex shader). Although the memory 158 in general can store a large number of graphics programs 166, only one such program is illustrated for ease of explanation.

The web browser application 162 can be any suitable browser capable of initiating and processing requests for web content, including graphics content. In some cases, the web browser application 162 receives shader programs that are already compiled into an instructions set supported by the graphics card 154. In other cases, when a user develops source code for the graphics program 166 in GLSL, for example, the graphics program compiler and linker 164 compiles and links the GLSL code to generate instructions compatible with the graphics card 154.

The server 170 includes a processing unit 172, which may be generally similar to the CPU 156, a memory 174, and a network interface 176. A developer may use the browser application 162 to provide the graphics program 166 to the server 170. The server 170 may implement several functions for generating a test specification and expose these functions (e.g., as prototypes of functions that can be called in script) to developers of graphics content. For example, the server 170 may store instructions that implement a variable assignment API 180 for selecting a value within a graphics program and assigned a value to the variable, a test declaration API 182 for generating a unit test specification, a graphics program specification API 184 to specify the graphics program to be tested, etc.

The developer may write a test specification program 189 in a general-purpose scripting language such as JavaScript or in a proprietary scripting format, if desired. The test specification program may include calls to the APIs 180-182 to select the graphics program 166, describe a test to be performed on the graphics program 166, specify inputs to the graphics program 166 for executing the test, etc. For example, in one implementation, the developer specifies the entire source code of the graphics program 166 in the form of a string assigned to a variable of the appropriate type (e.g., a character array). In operation, the developer provides the test specification program and the graphics program 166, which may be embedded in the test specification program, to the server 170. In response, the server 170 generates a test graphics program to be executed on the graphics card 154.

Figure 3B:
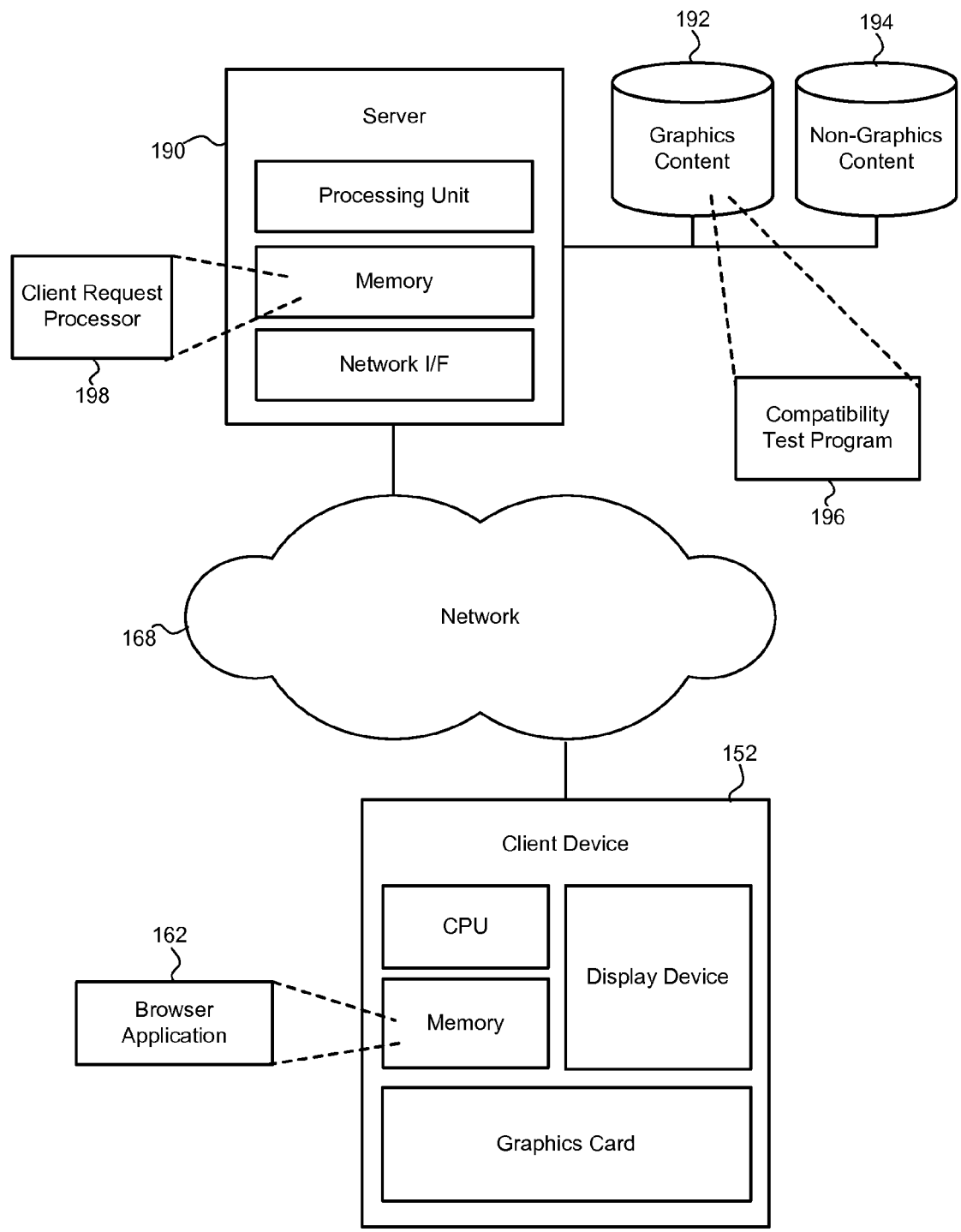
FIG. 3B is diagram of an system in which a server uses one of the techniques of the present disclosure to test compatibility between a graphics program and a graphics card of a client device on which the graphics program is to be executed.

In another configuration illustrated in FIG. 3B, the browser application 152 executing on the client device 152 requests content from a content server 190, which can provide graphics content 192 as well as non-graphics content 194 to client devices via the network 168. A client request processor 198, operating in the content server 190, is configured to automatically provide a compatibility test program 196 to the client device 152 in response to detecting that the client device 152 is requesting a certain type of graphics content for the first time. An example method which the client request processor 198 may implement is discussed in more detail with reference to FIG. 9, and an operation of an example compatibility test program 196 is discussed with reference to FIG. 10.

Example Implementation of a Graphics Program Test Framework

Figure 4:
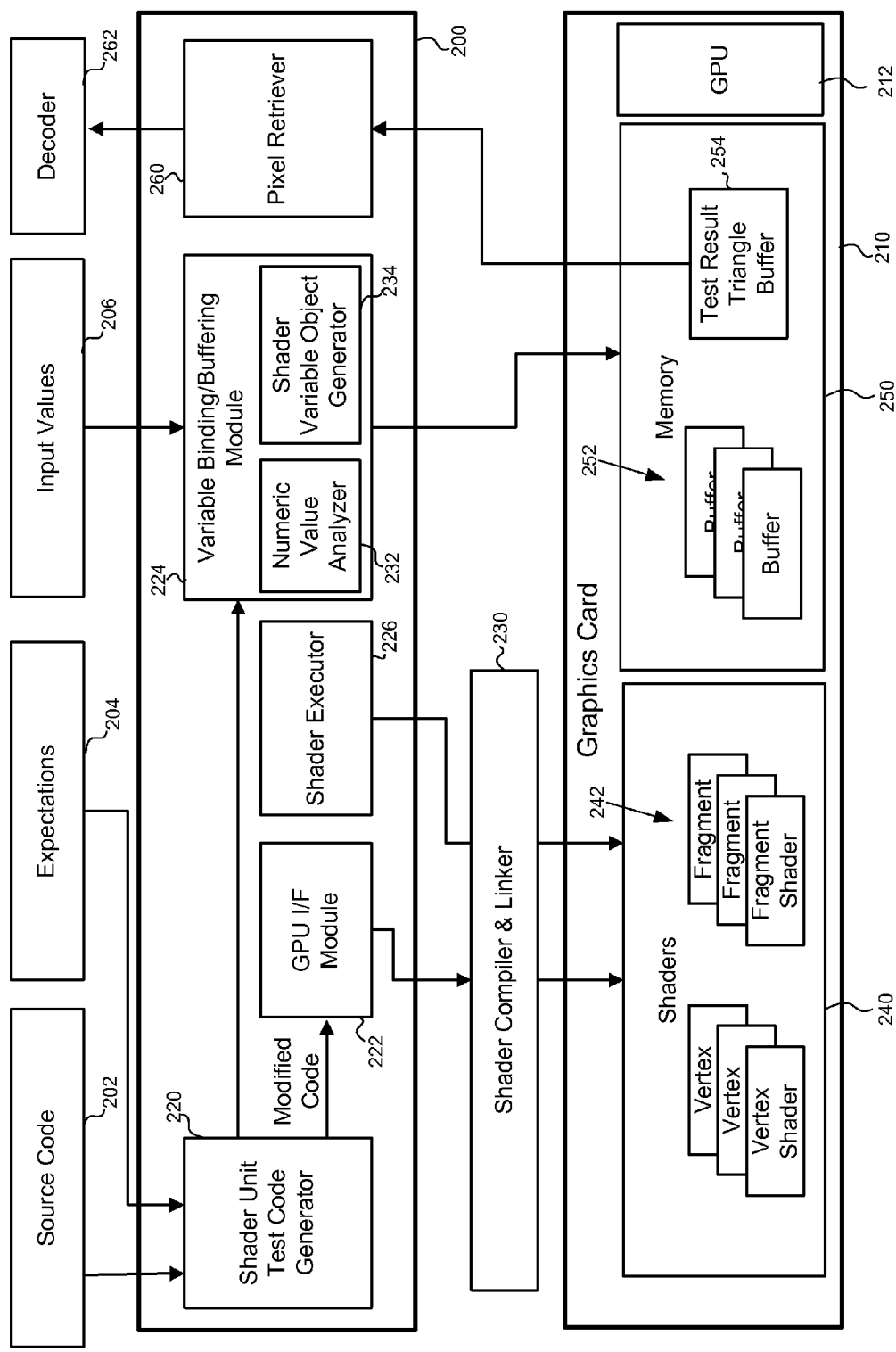
FIG. 4 is a more detailed block diagram of a test framework interacting with a graphics processing unit (GPU), shader source code, and user scripts, that may be implemented in the computing device of FIG. 2.

Next, FIG. 4 illustrates an example shader unit test framework 200 and several relevant components in more detail. Similar to the test framework 10 or 120 discussed above, the test framework 200 receives source code 202 that specifies shader programs, expectation descriptions 204, and input values 206. The test framework 200 then tests the shader programs in accordance with the expectation descriptions 204 and the input values 206 using a graphics card 210, which includes a GPU 212.

The test framework 200 includes a shader unit test code generator 220 configured to automatically modify shader programs being tested, a GPU interface module 222 to provide the modified shader programs to the graphics card 212 (via a shader compiler and linker 230), a variable binding/buffering module 224 to analyze and provide the input values 206 to the graphics card 210, and a shader executor 226 to cause the modified shader programs to execute on the graphics card 210.

The variable binding/buffering module 224 may include a numeric value analyzer 232 and a shader variable object generator 234. In general, the shader variable object generator 234 may generate objects that provide interfaces for buffering and binding data (e.g., between a JavaScript variable and a buffer in the graphics card 210). For numeric values, such as vectors, matrices, floats, and ints, the numeric value analyzer 232 may analyze the source code to determine which function should be used when buffering. To this end, the numeric value analyzer 232 may analyze at the variable type declaration, analyze the qualifier (while accounting for the fact that some of the varying have been rewritten as uniforms at this stage of processing the source code), and determine the proper type, such as float, int, vec2, mat3, etc. In view of this determination, the binding/buffering module 224 may make appropriate calls to bind and buffer data. For example, in response to detecting a variable that is a uniform mat3, the variable binding/buffering module 224 may buffer the corresponding data using uniformMatrix3f.

As illustrated in FIG. 4, the GPU 210 includes a module 240 to store instructions of compiled shader programs 242 and a memory 250 to store various data buffers 252 as well as a test result data buffer 252.

Once the execution of a shader program is complete, a pixel retriever 260 may retrieve the color-encoded value in the test result data buffer 252 (via a readPixels( ) call, for example) and provide the retrieved value to a decoder 262. In turn, the decoder 262 may generate a numeric or alphanumeric indication of the retrieved value. The decoder 262 in some cases also may generate an accompanying text (e.g., "Unit test #4 of vertex shader MyVertexShader PASSED."). Moreover, the decoder 262 may automatically generate a coverage report, i.e., a report that indicates which portions of the code were "hit" during execution. Thus, if the GLSL code of a shader program includes various if-then branches, the decoder 262 can provide information to identify which branches of the code were visited.

Figure 5:
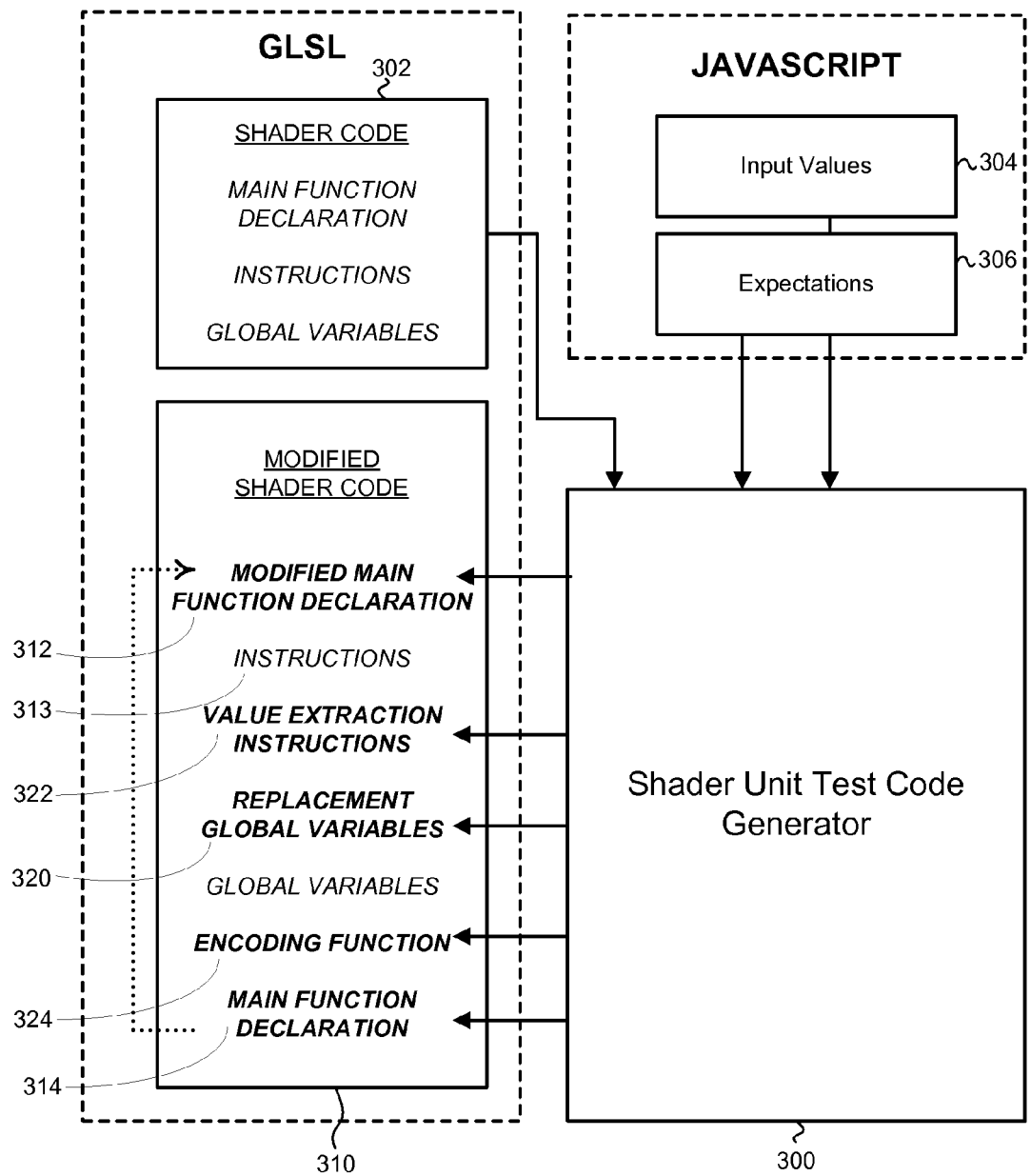
FIG. 5 is a block diagram that illustrates automatic generation of modified code for a shader program, which can be implemented in a test framework of the present disclosure.

Next, FIG. 5 illustrates operation of a shader unit test code generator ("code generator") 300 that automatically generates a modified version of a shader program for testing the original shader program. The code generator 300 may operate in the test network 10, 120, or 200, for example. More particularly, in a certain embodiment, the shader unit test code generator 220 of FIG. 4 is implemented similar to the code generator 300.

The code generator 300 may receive the source code of a shader program 302. The shader program 302 may be provided in the GLSL language and include the main( ) function declaration encompassing instructions to be executed by the shader program 302. For ease of illustration, the shader program 302 is depicted as operating only on global variables. However, it will be understood that the shader program 302 in general may operate on variables of any scope. It is also noted that the shader program 302 may be a vertex shader or a fragment shader.

In addition to the source code, the code generator 300 may receive input values 304 and expectation definitions 306 as additional inputs. As discussed above, the input values 304 and expectation definitions 306 may specify variables to be used by the program shader and the results expected to be produced by the program shader, respectively.

Using the data 302, 304, and 306, the code generator 300 generates a modified source code 310. By way of example only, FIG. 5 illustrates that the modified source code 310 includes a modified declaration 312 of the main( ) function. For example, the modified declaration 312 may be _TestMain( ) The code generator 300 generates the body of the _TestMain( ) function that is generally similar to the body of the original main( ) function. More precisely, the _TestMain( ) function performs the original vertex or pixel transformation functions (by executing instructions 313), but some or all of the variables on which _TestMain( ) operates are renamed to allow the corresponding test framework to use the variables for storing and transmitting test results.

The code generator 300 also generates a new declaration 314 of the main( ) function. Generally speaking, the new main( ) function invokes the _TestMain( ) function, compares the result of executing the _TestMain( ) function with the expected result specified via the input values 304, and encodes the result of the comparison in an output variable. For example, in case of a fragment shader, the output value may be output via gl_FragColor. In one implementation, the code generator 300 replaces references to gl_FragColor and gl_Position with replacement (or "mock") variables 320 such as _gl_FragColor and _gl_Position, respectively. In this manner, the variables gl_FragColor and gl_Position may be used to output the results of testing a fragment shader or a vertex shader, respectively.

With continued reference to FIG. 5, the code generator 300 may automatically generate, and insert into the modified source code 310, value encoding or extraction instructions 322 for outputting an actual value produced by a shader program in the event the test case fails. These instructions 322 may be similar to the encoder 130 discussed above. In an example embodiment of the code generator 300, the extraction instructions 322 encode a value of type float as a four-channel color. Further, the code generator 302 may include an encoding function 324 in the modified source code 310.

In general, the code generator 300 modifies the code for vertex shaders and fragment shaders in a similar manner. However, because vertex shaders and fragment shaders operate at different stages in a graphics pipeline, the code generator 300 also may make modifications that are specific to the shader type. For example, to allow developers to check and/or retrieve values for gl_FragCoord, gl_FrontFacing, and gl_PointCoord, the code generator 300 generates mock uniforms such as vec4 mock_FragCoord, for example, and replaces all instances of the original variables in the code being tested with the corresponding mock variables. Further, the code generator 300 may automatically convert all varying variables declared in a fragment shader to uniforms. In this manner, a value for a varying can be set without having to pass the value through a fragment shader.

Still further, for the discard instruction, the code generator 300 may generate code to store a global Boolean variable bool testDiscarded. The code generator 300 then replaces every occurrence of the discard instruction with the following snippet:

```
testDiscarded = true;
return;
```

A routine that calls a function including the discard instruction can check the value of the testDiscarded flag before proceeding with executing the rest of the code. The code generator 300 further generates the code to generate an assert to see whether the value of testDiscarded matches the developer's expectation. According to this implementation, if the developer asserts that a test should be discarded, the developer cannot assert on anything else.

In addition to generating and inserting code to encode asserts and encode binary test results (i.e., pass or fail), the code generator 300 can rewrite a shader program to generate indications of which blocks and/or branches of the code have been hit. In an example implementation, a block of code is defined as a section containing instructions that always execute sequentially. In GLSL, a block of code effectively is every section enclosed in braces or #ifdef directives. The code generator 300 accordingly can insert instructions 322 into each block of code with a corresponding numerical identifier of the block.

By way of a more specific example, the code generator 300 may define a global integer that stores code coverage state for a particular run. Code coverage then may be binary-encoded, i.e., each block of code may be assigned a bit that is set to one if the block of code is hit during a particular run, or to zero if the block of code is not hit during the run. Even more specifically, a modified shader may output asserts or debug values via a 32-bit buffer, of which 24 bits may be used to encode information. Because a typical shader program includes less than 24 blocks, a single integer is sufficient to reflect the test coverage. However, if the code includes more than 24 blocks, the code coverage code may be run multiple times, each time for collecting information regarding different blocks of code.

Example Template for a Test Specification Program

Figure 6:
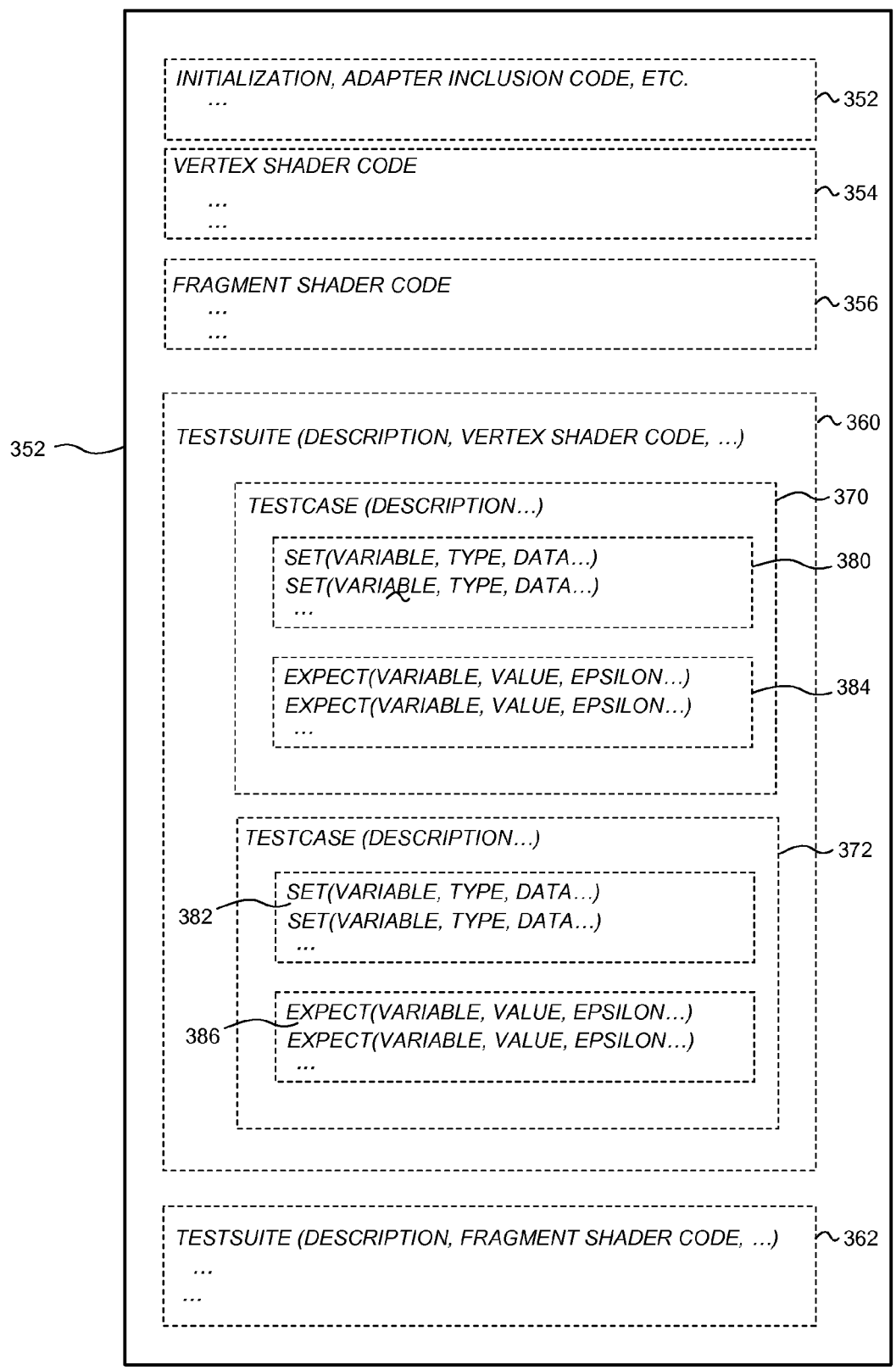
FIG. 6 is a diagram of an example shader program test template which a user may use when operating in a test framework of the present disclosure.

To more clearly illustrate how a user may interact with a test framework 10, 120, or 200, FIG. 6 depicts an example shader program test template 350 via which a user can specify shader source code, inputs, and expectation values. Generally speaking, the test framework 10, 120, or 200 can provide an easy-to-use, efficient declarative user interface for developing test cases and test suites with multiple test cases. The test template 350 may be developed in a scripting language using one or several APIs implemented by the corresponding test framework. In an embodiment, a network server (e.g., the server 170 of FIG. 3A or the server 190 of FIG. 3B) provides the shader program test template 350 to a developer upon request. In some situations, the server may also automatically test results from one or several computing devices to generate project-wide metrics, for example.

The shader program test template 350 includes an initialization section 352 that contains code for including the necessary libraries, adapters, boostrapping code, etc. The user can insert the source code for a vertex shader program into section 354, and the source code for a fragment shader program into section 356. As one example, the template 350 accepts the GLSL source code as a set of strings provided in JavaScript.

The user can then define one or several test suite routines, such as test suite routines 360 and 362. In general, a user can specify any desired number of test suites. In an example implementation5, each of the test suite routines 360 and 362 receives a description of the test suite as one parameter (e.g., "Fragment Shader Tests"), a reference to the source code as another parameter (e.g., reference to the variable that stores the text strings of the GLSL code of the shader), and the definition of individual test cases as another parameter.

Each of the test suite routines 360 and 362 includes one or several test case routines 370 and 372, each of which may receive a description of the test case as a parameter. Referring to the test case routine 370, an input definition section 380 may include one or several calls 382 to a function that creates a variable, associates the specified type, assigns the specified value or values to the variable, and specifies how the variable should be buffered. An expectation definition section 384 may include one or several calls 386 to a function that specifies a variable, specifies an expected value for the variable, and specifies the margin of error for the variable (e.g., due to rounding off float values).

Example Methods for Testing Execution and Compatibility of Graphics Programs

Figure 7:
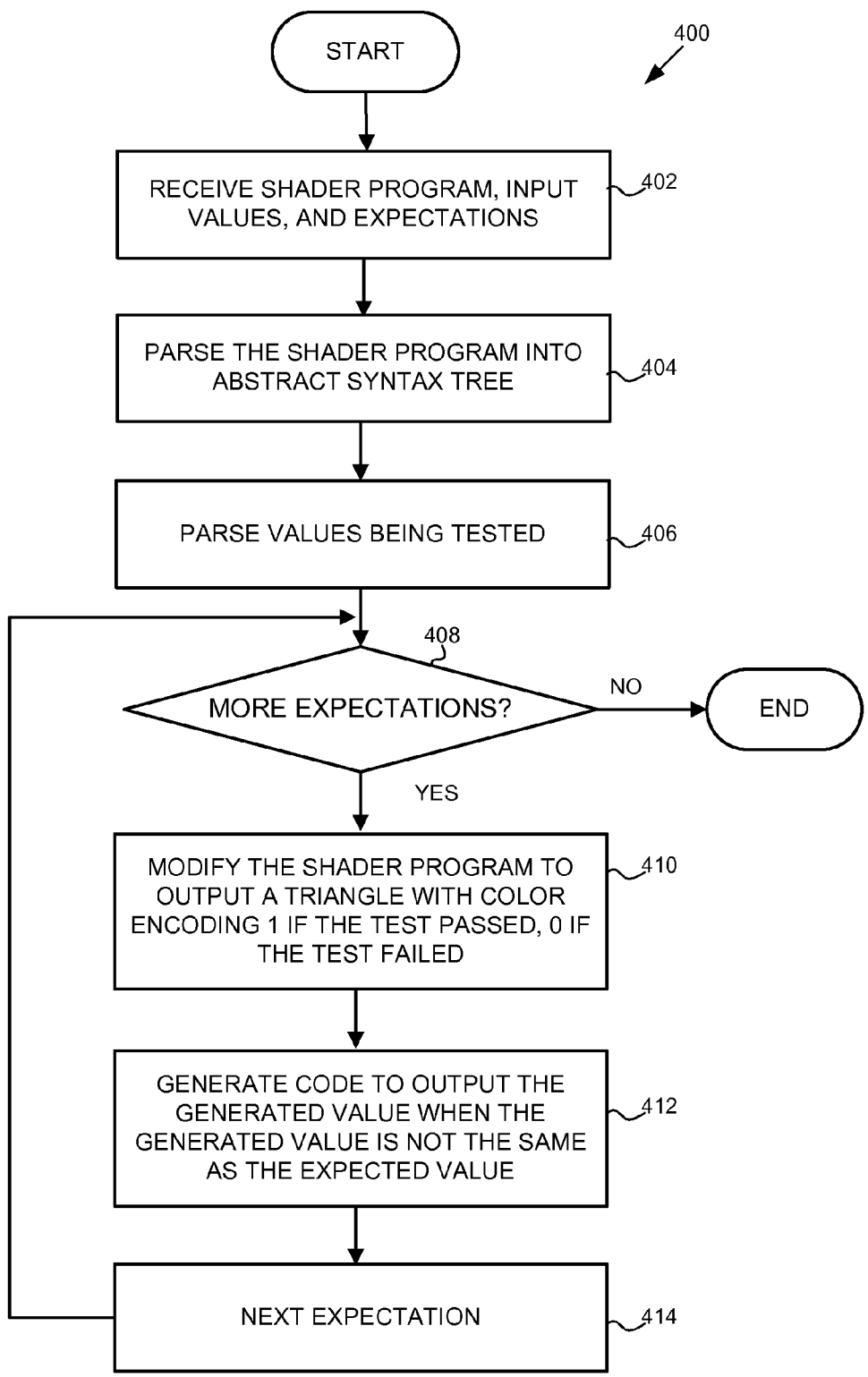
FIG. 7 is a flow diagram of an example method for automatically testing shader programs, which may be implemented in a test framework of the present disclosure.

FIG. 7 is a flow diagram of an example method 400 for automatically testing shader programs. The method 400 may be implemented in the test framework 10, 120, or 200, for example. The method 400 begins at block 402, where a shader program, input values, and expectations are received. Next, at block 404, the shader program is parsed into an abstract syntax tree (AST) representation to enable accurate and efficient modification of the source code. However, the shader program in general may be parsed using any suitable technique. The values being tested, provided as expectation descriptions, are parsed at block 406.

According to the method 400, for each value being tested, the source code of the shader program is modified to generate an appropriate output value. In particular, a determination is made whether more expectation descriptions are available at block 408. If an expectation description is available, the flow proceeds to block 410, and the source code of the shader program is modified to cause the program to output a triangle with a certain color (e.g., green) if the test case passed, and output a triangle with a different color (e.g., red) if the test case failed. More specifically, as discussed above, the source code may be modified to execute a comparison between the output of the shader code being tested and the corresponding expected value. The comparison may be executed within the modified main( ) function.

Further, in some implementations, the source code is further modified to cause the modified code to output the actual value generated by the shader program being tested, if the test failed (block 412). The flow then proceeds to block 414 to transition to the next expectation, and returns to block 408 to determine whether more expectations are available. The method 400 completes after block 410 and 412 have been executed for every value being tested.

Figure 8:
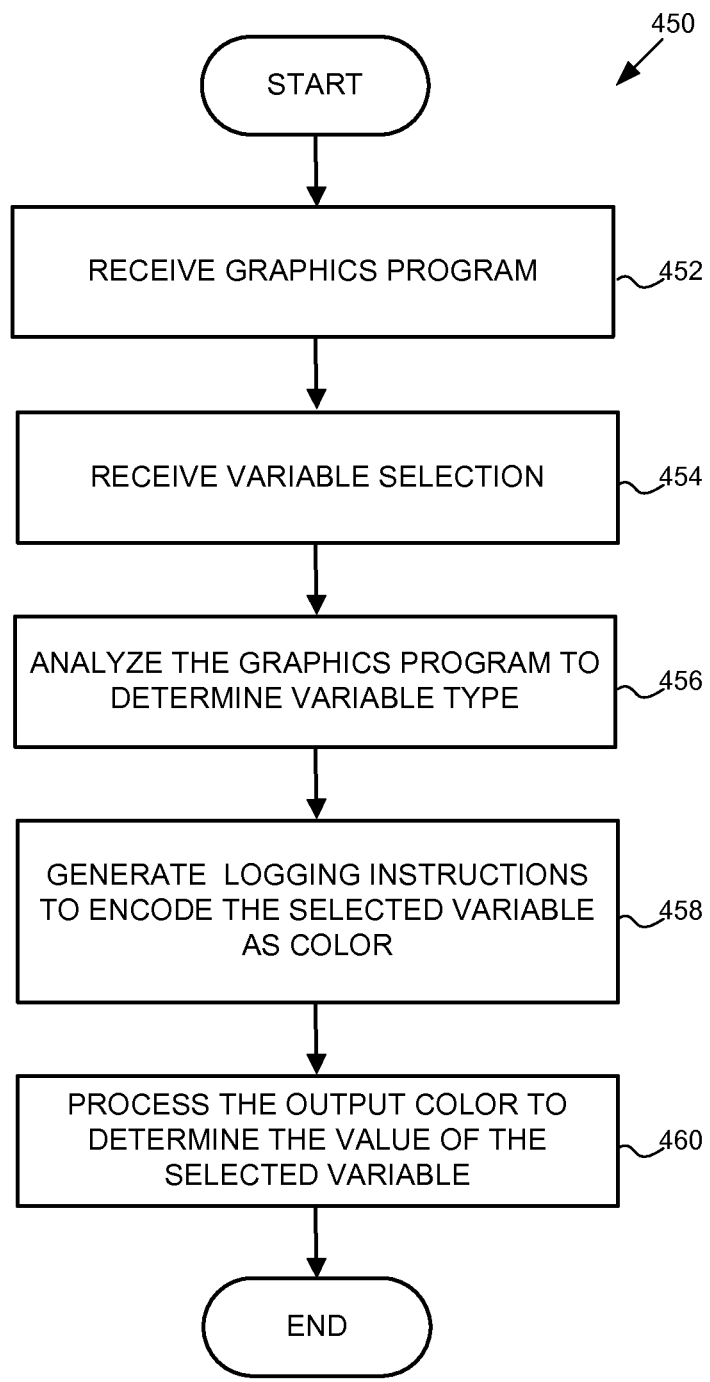
FIG. 8 is a flow diagram of an example method for causing a graphics program to log the value of a selected variable that may be implemented in a test framework of the present disclosure.

Next, FIG. 8 illustrates an example method 450 for causing a graphics program to log the value of a selected variable that may be implemented in a test framework of the present disclosure. The method 450 can execute on the processor of a computing device to analyze and modify a graphics program executable on a graphics card. At blocks 452 and 454 respectively, a graphics program and a selection of a variable are received. For example, as discussed above, a developer can invoke one or several API functions for specifying a graphics program, selecting a variable on which the graphics program operates, etc. In some cases, the selection of a variable at block 454 corresponds to a call to an assert, via which the developer of the graphics program confirms whether the selected variable acquired the expected value (also specified at block 454).

In general, the variable selected at block 454 need not be the output of the specified graphics program. Rather, the selected variable can be a variable used only internally by the graphics program, or a variable used by several graphics programs (e.g. a vertex shader and a fragment shader) to pass intermediate values that are not ultimately output as color. The method 450 thus can operate on variables which are not otherwise accessible outside the graphics card.

At block 456, the type of the selected variable is analyzed in the source of the graphics program to determine how the selected variable should be output. In particular, the method 450 may determine how many are required to encode the selected variable. The method 450 then proceeds to block 458 to generate a logging instruction using the techniques discussed above, for example. Once the modified graphics program including the logging instruction is executed, the method 450 analyzes the logged variable at block 460. For example, an instruction to retrieve pixel color from a memory buffer of the graphics card can be executed to obtain a numeric value. If desired, the obtained value can be further processed to generate a more detailed description of the retrieved value, a text-based indication of whether the assert passed or failed, etc.

Figure 9:
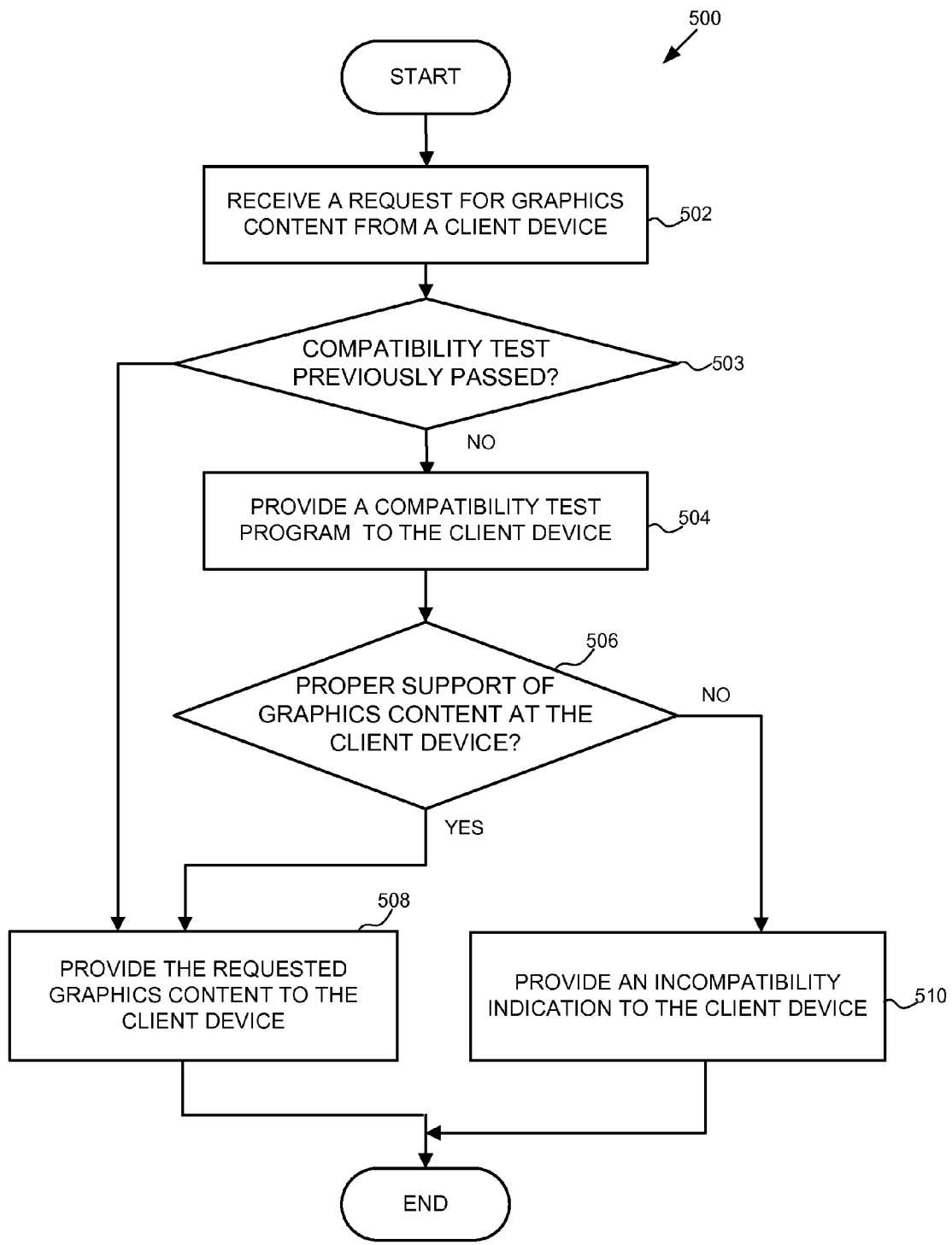
FIG. 9 a flow diagram of an example method for testing compatibility between a graphics card and a graphics program which a server device provides to a client device for execution on a general-purpose processor.

FIG. 9 a flow diagram of an example method 500 for testing compatibility between a graphics card and a graphics program. The method 500 can be implemented in the server 190 of FIG. 3B, for example, or a similar device. At block 502, a request for graphics content is received from a client device. For example, the server that implements the method 500 can provide maps as WebGL content. The request at block 502 in this case may specify a geographic region, map type, zoom level, etc.

In one implementation, the request also includes an indication of whether the client device previously passed compatibility testing. The indication can be included in a cookie, for example. If it is determined at block 503 that the client device already passed compatibility testing, the flow proceeds directly to block 508. Otherwise, if the client device is requesting graphics content (or a particular type of graphics content) from the server for the first time, the flow proceeds to block 504, where a compatibility test program is provided to the client device. A flow diagram of an example compatibility test program is discussed below with reference to FIG. 10.

Next, an indication of whether the client device can properly support the required content is received at block 504. The client device generates the indication upon executing the compatibility test program provided at block 502 on the graphics card of the client device. If it is determined that the client device properly supports graphics content (block 506), the requested content is provided to the client device at block 508. Otherwise, the flow proceeds to block 510, where an incompatibility indication is provided to the client device.

In other implementations, a server can provide a compatibility test program to a client device along with the requested content. More generally, a server can provide compatibility test programs to client devices in any suitable manner, e.g., in response to an explicit request for compatibility testing, upon updating the version of the programming language used to define the graphics content, etc.

Figure 10:
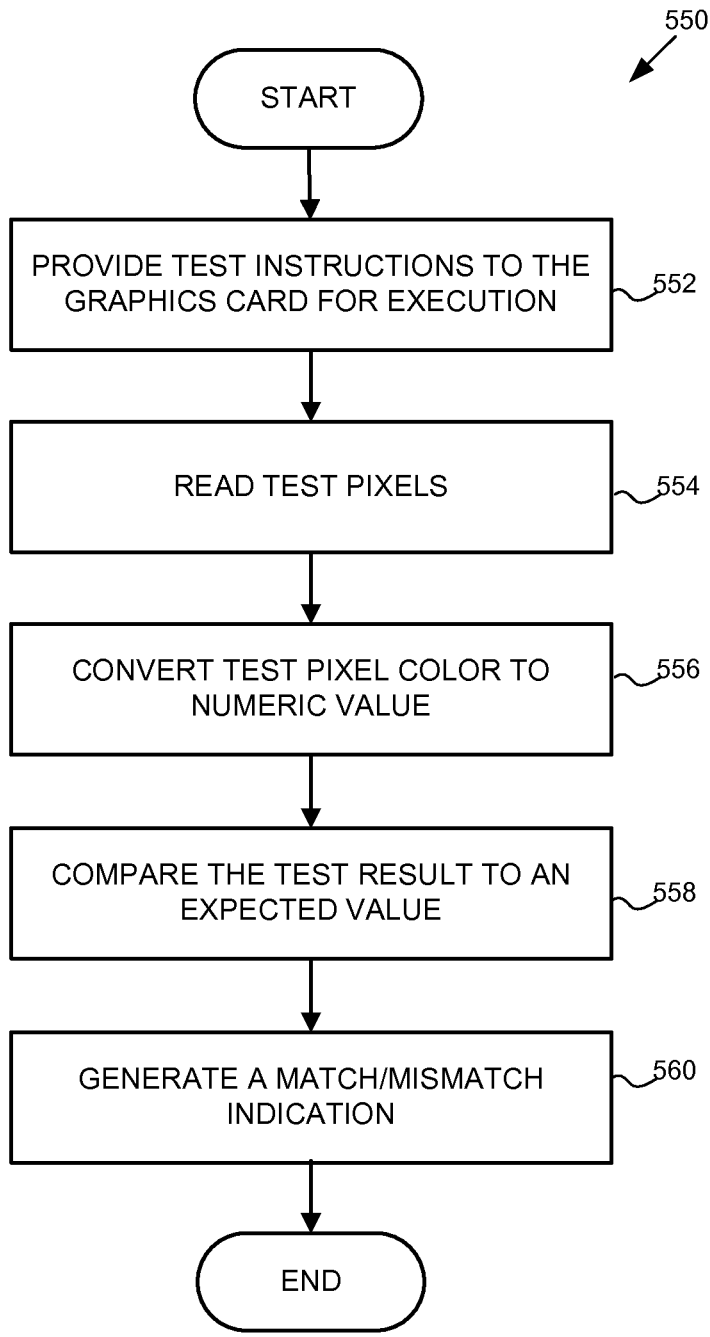
FIG. 10 is a flow diagram of an example compatibility test program that executes on a graphics card.

FIG. 10 is a flow diagram of an example compatibility test program 550 that executes on a client device. The compatibility test program 550 can include instructions that execute on a general-purpose processor (e.g., the CPU) as well as instructions that execute on a graphics card (e.g., the GPU). FIG. 10 illustrates the flow of the compatibility test program 550 on a general-purpose processor, such as the CPU 102 or the CPU 156 depicted in FIG. 2 and FIGS. 3A-B, respectively.

At block 552, test instructions are provided to the graphics card for execution. For example, a set of GLSL instructions that execute on the graphics card but not on the CPU are loaded into the graphics card, and a command is issued to begin execution. Basic test instructions can simply render a triangle and fill the triangle with a certain color, for example. In general, however, test instructions can be as complex as necessary to ascertain the ability of the graphics card to render graphics content. In any case, the test instructions provided to the graphics card at block 552 can affect the color of a certain preselected pixel.

Once the test instructions execute on the graphics card, the color of the preselected pixel is retrieved (block 554) and converted to a numeric value (block 556). Next, at block 558, the numeric value is compared to an expected value to determine whether the test instructions executed successfully. At block 560, either a match indication or a mismatch indication is generated, depending on whether the expected value matched the execution result. The indication can be provided to the user via the user interface of the client device and/or to the server.

Further, in some cases, the blocks 552-560 are repeated multiple times to execute a set of tests rather than a single test. For example, the compatibility test program 550 may require that a certain number of tests pass prior to determining that the client device is capable of supporting graphics content available at the server.

In view of the foregoing, it is noted that the techniques of the present disclosure allow users to test shader programs directly on a graphics card without having to rely on an emulator or another specialized environment. In this manner, issues related to specific graphics card can be efficiently and timely discovered, and differences between graphics card can be ascertained. Moreover, if it desirable to execute unit test cases on an emulator, a browser such as Mozilla Firefox can be compiled with Mesa 3D graphics library for execution on an emulator. In this manner, the test framework 10, 120, or 200 discussed above can be utilized both on computing devices that includes a graphics card and on computing devices that do not include graphics cards.

Example Use of the APIs

By way of still further illustration, example use of a graphics program test framework is discussed below with reference to the code segments below. Referring back to FIG. 6, this example code can be used with the test template 350, for example. In addition to instructions with a syntax that conforms to JavaScript, the code below includes comments on lines that begin with two forward slashes ("//").

An example GLSL vertex shader program and an example GLSL fragment shader program are assigned to respective variables as text strings:

```
var testVertexShaderCode =
    'uniform vec4 uTestLocation;' +
    'uniform mat4 uTestMatrix;' +
    'attribute float aMultiplier;' +
    'void main(void) {' +
        'gl_Position = aMultiplier * uTestMatrix * uTestLocation;' +
    '}';
var testFragmentShaderCode =
    'varying vec4 uTestColor;' +
    'uniform mat4 uTestMatrix;' +
    'uniform sampler2D uSomeTexture;' +
    'void main(void) {' +
        // Notice the use of a built in variable
        'if (!gl_FrontFacing) {' +
        // And the use of Discard.
        ' discard;' +
        '}' +
        'gl_FragColor = uTestMatrix * uTestColor;' +
    '}';
```

An example test suite for a vertex shader is defined below. The code fragment below includes several example calls to functions for defining a test suite, selecting variables, specifying expected values for the variables, etc.:

```
// In this example, the fragment shader is tested first. Tests are broken up into TestSuites.
// There can be multiple test suites per file, but typically a developer will want to create
// one test suite per shader type, so one test suite for the fragment shader,
// one test suite for the vertex shader. A test suite is declared according to following format:
// fragmentTestSutie('Test Description',
//                   'Source code of fragment shader',
//                   function ( ) {
//                       Declare test cases here
//                   });
fragmentTestSuite('Fragment Shader Test', testFragmentShaderCode, function( ) {
    // A test suite includes test cases. Test cases can have a series
    // of input values and a series of expectations. testMain( )
    // is called below. This function will test the main function of a shader. This is
    // useful to test the final output of a shader, be it a built-in such as
    // gl_FragColor or a varying.
    testMain('Fragment Test Case', function( ) {
        // Input Values
        // Input variables are set with the following fluent interface: start with a call
        // to "set"
        // set('variable name')
        // which creates the variable. There is no need to specify what the type or
        // qualifier is for this variable. The framework will infer the type from the
        // source code.
        // We then use one of the as functions to specify a kind of data
        // for the variable. In the case below, "asArray" is called, which
        // will expect an array of numbers to buffer.
        //
        // In addition to asArray, the following options are available:
        //  - asArray(/** @type Array.<number> */)
        //  - asNumber(/** @type number */)
        //  - asBoolean(/** @type boolean} */)
        //  - asSingeColor(/** @type Array.<number> length of 4*/)
        set('uTestColor').asArray([1, 2, 3, 1])
        // By default, the framework will use Int32Array for any integer types (int,
        // bool, ivec3, etc...) and Float32Array for any float types. This can be
        // changed by calling "bufferedAs" with the type the developer prefers to be used for
        // buffering data.
        set('uTestMatrix').asArray([1, 0, 0, 0,
                                    0, 1, 0, 0,
                                    0, 0, 1, 0,
                                    0, 0, 0, 1])
                         .bufferedAs(Float32Array);
        // The developer can set any built-in variables as well as uniforms and varyings in a
        // Fragment shader test.
        set('gl_FrontFacing').asBoolean(true);
        // The developer can specify textures as well with asSingleColor.
        set('uSomeTexture').asSingleColor([127, 0, 0, 255]);
        // Expectations
        // After the developer sets up the input values for a test case, she can set up the
        // expectations she has for that test case. The developer sets up expectations
        // first by making a call into expect(/** @type string */). expect( ) will
        // create an expectation stub. The following options are available for the stub:
        //
```

```
            //  -equal(/** @type {number|Array.<number>})
            //  -notEqual(/** @type {number|Array.<number>})
            //  -lessThan(/** @type {number|Array.<number>})
            //  -lessThanEqual(/** @type {number|Array.<number>})
            //  -greaterThan(/** @type {number|Array.<number>})
            //  -greaterThanEqual(/** @type {number|Array.<number>})
            //
            // Each of these functions will expect the corresponding comparisons to
            // return true. If the expectation fails, the test case logs
            // the actual value.
            expect('gl_FragColor')
                .equal([1, 2, 3, 1])
                // Since dealing with floats is so prevalent in GLSL, the test framework has the built-in
                // ability to specify how much error will be allowed in
                // withEpsilonOf(/** @type {number} */). The parameter to withEpsilonOf
                // sets the amount of absolute error allowed with making comparisons
                // before the expectation will fail.
                .withEpsilonOf(0.01);
            expect('texture2D(uSomeTexture, vec2(.5, .5))')
                // For vector comparisons, the developer can decide to expect to pass the
                // expectation if the comparison is true for any of the indices as
                // opposed to all of the indices. The developer can change with by using the any( )
                // or all( ) functions. Internally, in the GLSL this will expect:
                //     - any(equal(texture2D(uSomeTexture, vec2(.5, .5)),
                //               vec4(.5, 0., 0., 1.)))
                //     - all(equal(texture2D(uSomeTexture, vec2(.5, .5)),
                //               vec4(.5, 0., 0., 1.)))
                // to return true (ignoring the epsilon code).
                .any( )
                .equal([0.5, 0, 0, 1])
                .withEpsilonOf(0.01);
        });
        testMain('Discard Test Case', function( ) {
            // Input Values
            set('uTestColor').asArray([1, 2, 3, 1]);
            set('uTestMatrix').asArray([1, 0, 0, 0,
                                         0, 1, 0, 0,
                                         0, 0, 1, 0,
                                         0, 0, 0, 1]);
            set('gl_FrontFacing').asBoolean(false);
            set('uSomeTexture').asSingleColor([127, 0, 0, 255]);
            // Expectations
            // If the developer wants to test that a shader discards, we can use expectDiscard( ).
            // The developer cannot use expectDiscard with any other expectations because, by
            // definition, the shader will have discarded, and so there is no other data
            // the developer can extract.
            expectDiscard( );
        });
});
```

Next, an example test suite for a vertex shader is defined below:

```
// Testing Vertex Shaders is generally similar to testing fragment shaders.
// However, the developer now uses vertexTestSuite instead of
// fragmentTestSuite.
vertexTestSuite('Vertex Shader Test', testVertexShaderCode, function( ) {
    testMain('Sample Test Case', function( ) {
    // Input Values
    set('uTestLocation').asArray([1, 2, 3, 1]);
        set('uTestMatrix').asArray([1, 0, 0, 0,
                                     0, 1, 0, 0,
                                     0, 0, 1, 0,
                                     0, 0, 0, 1]);
    // In a vertex test suite, the developer can also set attributes as input.
    set('aMultiplier').asNumber(2);
    // Expectations
        // If the developer is comparing a value to a scalar, he can just pass in
        the scalar value
    // to the comparison function.
    // For notEqual, the epsilon will be treated as the threshold for which
    // the test value must be outside the expected value. So, in the example
    // below, in order for this expectation to pass, gl_Position[0] must be:
    // 8.9 < gl_Position[0] || gl_Position[0] > 9.1
                expect('gl_Position[0]')
                    .notEqual(2)
                    .withEpsilonOf(0.1);
    });
});
```

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for testing graphics programs on a graphics card through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium storing thereon instructions for providing a declarative user interface for testing graphics programs, the instructions comprising:
    first instructions that implement an application programming interface (API) that, when used in a program executable on a general-purpose processor, specifies:
    (i) a graphics program to be tested, wherein the graphics program is stored on a computer-readable medium and includes a plurality of instructions executable on a graphics card,
    (ii) a test input to be applied to the graphics program, and
    (iii) an expected result of executing the graphics program on the graphics card when the test input is applied to the graphics program;
    the instructions further comprising:
    second instructions that implement a test code generator that, when executed on the general-purpose processor, is configured to:
        process a test specification program that invokes the API to specify the graphics program, the test input, and the expected result; and
        automatically generate a test graphics program based on the specified graphics program, wherein the test graphics program is configured to execute on the graphics card to test the graphics program using the specified test input and the specified expected result.

2. The computer-readable medium of claim 1, wherein the API includes a plurality of functions that conform to a syntax of a scripting language interpretable on a web browsing application that executes on the general-purpose processor.

3. The computer-readable medium of claim 2, wherein the plurality of functions includes a graphics program specification function that, when invoked in a program, specifies the graphics program.

4. The computer-readable medium of claim 2, wherein the plurality of functions includes a variable assignment function that, when invoked in a program, specifies a variable referenced in the graphics program and a value to be assigned thereto, wherein the test specification programs specifies the test input using the variable assignment function.

5. The computer-readable medium of claim 2, wherein the plurality of functions includes a result expectation function that, when invoked in a program, specifies a value against which an indicated variable is to be tested, wherein the test graphics program specifies the expected result using the result expectation function.

6. The computer-readable of claim 1, wherein the test graphics program, when executed on the graphics card, generates a test result indicative of whether the graphics program outputs a result that matches the specified expected result.

7. The computer-readable medium of claim 6, wherein the API further specifies a margin of error tolerated in comparing the test result to the specified expected result.

8. The computer-readable medium of claim 6, wherein the API further specifies a type of comparison to be used to comparing the test result to the specified expected result, wherein the type of comparison is selected from a group including equal, not equal, less than, less than or equal, greater than, and greater than equal.

9. The computer-readable medium of claim 1, wherein the API further indicates whether the expected result is compared to (i) each value in a vector-based output of the graphics program or (ii) any value in the vector-based output of the graphics program.

10. A method in a computing device having a processor for automatically testing a graphics program executable on a graphics card, wherein the graphics card is communicatively coupled to the processor, the method comprising:
    receiving the graphics program at the computing device, wherein the graphics program includes a set of one or more instructions in a shading language supported by the graphics card;
    receiving, at the computing device, a test specification in a programming language different from the shading language, wherein the programming language is supported by the device but not by the graphics card, and wherein the test specification identifies the graphics program and specifies (i) a test input to be provided to the graphics program and (ii) an expected result which the graphics program is expected to generate based on the test input;
    automatically causing a test of the graphics program to be executed on the graphics card, including applying the test input to the graphics program and comparing a result of executing the graphics program to the expected result; and generating, at the computing device, an indication of whether the test of the graphics program executed according to the test specification.

11. The method of claim 10, further comprising:
providing an API for specifying the test input, the expected result, and the graphics program, wherein the API has syntax that conforms to the programming language of the test specification; and
parsing the test specification to detect a call to the API.

12. The method of claim 11, wherein the provided API receives a value for assignment to a variable used by the graphics program.

13. The method of claim 10, wherein the graphics program and the test specification are received in a single file that describes content of a web page using a mark-up language.

14. The method of claim 10, wherein causing the test of the graphics program to be executed on the graphics card includes:
automatically generating a modified graphics program based on the received graphics program and the test specification, wherein the modified graphics program is configured to output a test result as a color applied to one or several pixels, wherein the test result is indicative of whether the received graphics program executes on the graphics card according to the test specification; and
causing the modified graphics program to execute on the graphics card.

15. The method of claim 10, wherein the programming language is a scripting language interpretable at runtime on the processor of the computing device.

16. A computing device comprising:
a display device;
a graphics card including a graphics processing unit (GPU) communicatively coupled to the display device;
a processor communicatively coupled to the graphics card; and
a memory communicatively coupled to the processor storing thereon:
a graphics program including a plurality of instructions executable on the graphics card to render images for display on the display device;
a declarative user interface including a plurality of instructions executable on the processor but not on the graphics card, wherein the declarative user interface implements an API for specifying a test case for the graphics program, and wherein the API is invokable via a function having a syntax of a programming language executable on the processor; and
a test code generator including a plurality of instructions that, when executed on the processor, receives a test specification program that identifies the graphics program and invokes the API to specify the test case, and automatically generates a test graphics program based on the graphics program and the test case, wherein the test graphics program is configured to execute on the graphics card and output an indication of whether the graphics program satisfies the test case.

17. The computing device of claim 16, wherein the declarative user interface is configured to receive a string representation of the graphics program, and wherein the test specification program assigns the string representation of the graphics program to a variable.

18. The computing device of claim 16, wherein the API includes a plurality of functions including:
a test suite specification function to specify a test suite having a plurality of test cases including the specified test case, and
a test case specification function to specify a test case;
wherein each of the plurality of test cases is associated with a respective test input to be provided to the graphics program and an expected result corresponding to the test input.

19. The computing device of claim 18, wherein the plurality of functions further includes:
a variable assignment function to assign a specified value to a selected variable on which the graphics program operates;
a result expectation function to specify a value against which the selected variable is to be tested when the graphics program is executed.

20. The computing device of claim 19, wherein the declarative user interface includes a test template stored as data in the memory for developing the test specification program, wherein the test template includes a call to the test suite specification function, a call to the test specification function, a call to the variable assignment function, and a call to the result expectation function; wherein the memory further stores instructions to:
automatically provide the test template to a user via a user interface of the computing device;
receive a modified test template; and
process the modified test template as the test specification program.

* * * * *